United States Patent [19]

Watanabe

[11] Patent Number: 4,634,296
[45] Date of Patent: Jan. 6, 1987

[54] BALL SPLINE BEARING
[75] Inventor: Hitoshi Watanabe, Mino, Japan
[73] Assignee: Nippon Thompson Co., Ltd., Tokyo, Japan
[21] Appl. No.: 773,013
[22] Filed: Sep. 6, 1985
[30] Foreign Application Priority Data May 20, 1985 [JP] Japan .................... 60-106123

[51] Int. Cl.$^4$ .................... F16C 31/06; F16D 3/06
[52] U.S. Cl. .................... 384/45; 464/168
[58] Field of Search ............. 308/6 C, 6 R; 464/168

[56] References Cited

U.S. PATENT DOCUMENTS

| | | | |
|---|---|---|---|
| 1,918,108 | 7/1933 | Jonkhoff | 308/6 C |
| 2,945,366 | 7/1960 | Sears | 308/6 C X |
| 3,659,435 | 5/1972 | Nilsson | 464/168 |
| 3,673,817 | 7/1972 | Doran | 464/168 |
| 3,808,839 | 5/1974 | Teramachi | 464/168 |
| 4,127,309 | 11/1978 | Teramachi | 308/6 C |
| 4,309,061 | 1/1982 | Teramachi | 308/6 C |
| 4,406,502 | 9/1983 | Teramachi | 308/6 C |
| 4,553,796 | 11/1985 | Walter et al. | 308/6 C |

FOREIGN PATENT DOCUMENTS

| | | | |
|---|---|---|---|
| 2737104 | 3/1978 | Fed. Rep. of Germany | 308/6 C |
| 2834614 | 3/1979 | Fed. Rep. of Germany | 308/6 C |

*Primary Examiner*—Stuart S. Levy
*Assistant Examiner*—Thomas R. Hannon
*Attorney, Agent, or Firm*—Trexler, Bushnell & Wolters, Ltd.

[57] ABSTRACT

A cheap and small ball spline bearing comprises: identical balls; an outer hollow cylinder; a cylindrical holding apparatus fixed to the inner peripheral surface of this cylinder; and a spline axis. In the outer cylinder, three projections are formed in the inner peripheral surface at regular intervals in the axial direction, track grooves adapted to load the balls are formed in both side surfaces of each projection, and U-shaped grooves between the projections are formed to have the almost same depth. In the holding apparatus, infinite circulating passages for the balls using the both side surfaces as track grooves are formed symmetrically on the right and left sides with regard to the central line in the axial direction of each U-shaped groove, and windows each width of which is slightly narrower than the ball diameter are formed in the axial direction at the locations of the track grooves. The spline axis has six protuberances formed so as to sandwich the load balls existing at the locations of the projections of the cylinder, and track grooves are formed in the portions which are in contact with the balls. This bearing has a high rigidity and a small slide resistance and can be easily and accurately worked.

2 Claims, 14 Drawing Figures

FIG. 1A
PRIOR ART
FIG. 1B
PRIOR ART
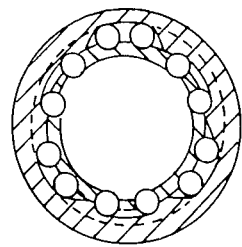
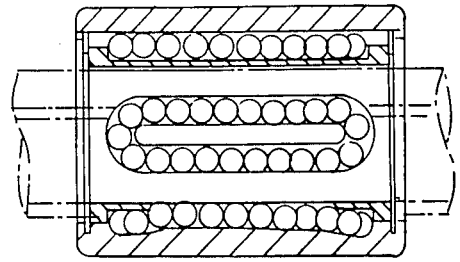
FIG. 2A
PRIOR ART
FIG. 2B
PRIOR ART
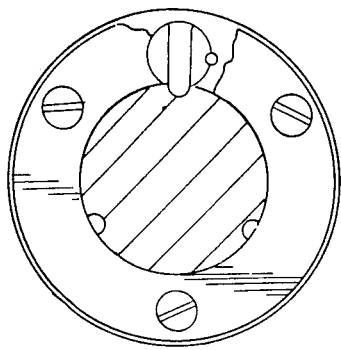
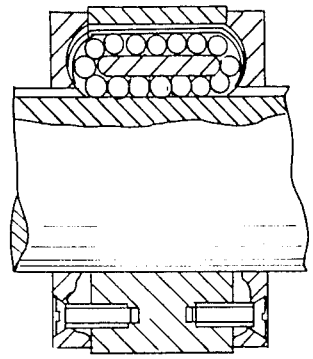

BALL SPLINE BEARING

BACKGROUND OF THE INVENTION

1. Field of the Invention

The present invention relates to an improvement in a ball spline bearing and, more particularly, to a cheap and rigid bearing having a small slide resistance which can be easily worked with a high degree of accuracy.

2. Description of the Prior Art

As prior arts of this kind of bearing, the bearing shown in FIGS. 1A and 1B (Japanese Patent Unexamined Publication No. 39937/1972) and the bearing shown in FIGS. 2A and 2B (Japanese Patent Examined Publication No. 7601/1970) are well known. The ball spline bearing of FIGS. 1A and 1B is constituted in a manner such that: shallow grooves and deep grooves are alternately formed in the inner surface of the outer cylinder; track grooves are formed on both side surfaces of the shallow groove; balls are arranged in the track grooves; and a shaft having coincident protuberances is inserted into the space. According to this bearing, the shape of the inner surface of the outer cylinder is complicated, so that there are drawbacks such that the working accuracies regarding the flatness of the track groove, the parallel degree among the respective tracks, and the like are low, and the lives of the balls in the load range often become short depending on their locations since the load distribution is not uniform. Further, since the protuberances of the shaft are protruded so as to be inserted into the right and left load balls, the geometrical moment of inertia of the axis is small and the problem regarding the rigidity of the shaft accordingly occurs.

Further, according to the ball spline bearing of FIGS. 2A and 2B, the load balls are moved outwardly in their radial directions and reach the return passage; therefore, there are drawbacks such that the outer diameter of the bearing becomes too large and this bearing cannot be miniaturized.

As described above, the conventional bearings have the drawbacks, respectively. A small-sized bearing having a high rigidity in which the accuracies of the track grooves are high is strongly demanded.

SUMMARY OF THE INVENTION

It is an object of the present invention to provide a small-sized ball spline bearing having a high rigidity which can be easily worked and in which accuracies of the track grooves are high.

This object is accomplished by a ball spline bearing comprising:

a number of identical balls;

an outer cylinder having a hollow cylindrical shape in which projections are formed in the inner peripheral surface at regular intervals in the axial direction and the track grooves adapted to load the balls are formed in both side surfaces of each projection and also the U-shaped grooves between the respective projections are formed so as to have a predetermined substantially same depth;

a cylindrical holding apparatus fixed to the inner peripheral surface of the outer cylinder in which the infinite circulating passages for the balls using the both side surfaces as track grooves are formed symmetrically on the right and left sides with regard to the central line in the axial direction of the U-shaped grooves and windows each width of which is slightly narrower than the diameter of each ball are formed in the axial direction at least at the locations of the track grooves; and a spline shaft which has protuberances formed so as to sandwich the load balls existing at the locations of the projections of the outer cylinder and in which the track grooves are formed in the portions which are in contact with the balls.

The foregoing object is also attained by a ball spline bearing according to the bearing as mentioned above, wherein the projections are formed at regular intervals at three locations in the inner peripheral surface of the outer cylinder, and the protuberances are formed at regular intervals at six locations on the spline shaft.

According to the ball spline bearings with the foregoing arrangements, the shape of the outer cylinder is simplified and the cheap and highly accurate outside shape is formed. In addition, the rigidity of the spline shaft is increased since the number of protuberances is increased.

BRIEF DESCRIPTION OF THE DRAWINGS

FIGS. 1A, 1B, 2A, and 2B are schematic cross sectional views of ball spline bearings of conventional examples;

FIGS. 3 to 8B show a ball spline bearing in one embodiment according to the present invention;

FIG. 3 is a perspective view;

FIG. 4 is a cross sectional view in the radial direction;

FIG. 5 is a cross sectional view taken along the line A—A in FIG. 4 in which a spline shaft is omitted;

FIGS. 6 and 7 are cross sectional views showing the spline shaft and a holding apparatus, respectively;

FIG. 8B is a cross sectional view taken along the line B—B in FIG. 8A;

DESCRIPTION OF THE PREFERRED EMBODIMENTS

One embodiment of the present invention will now be described in detail hereinbelow with reference to the drawings.

Figure 3:
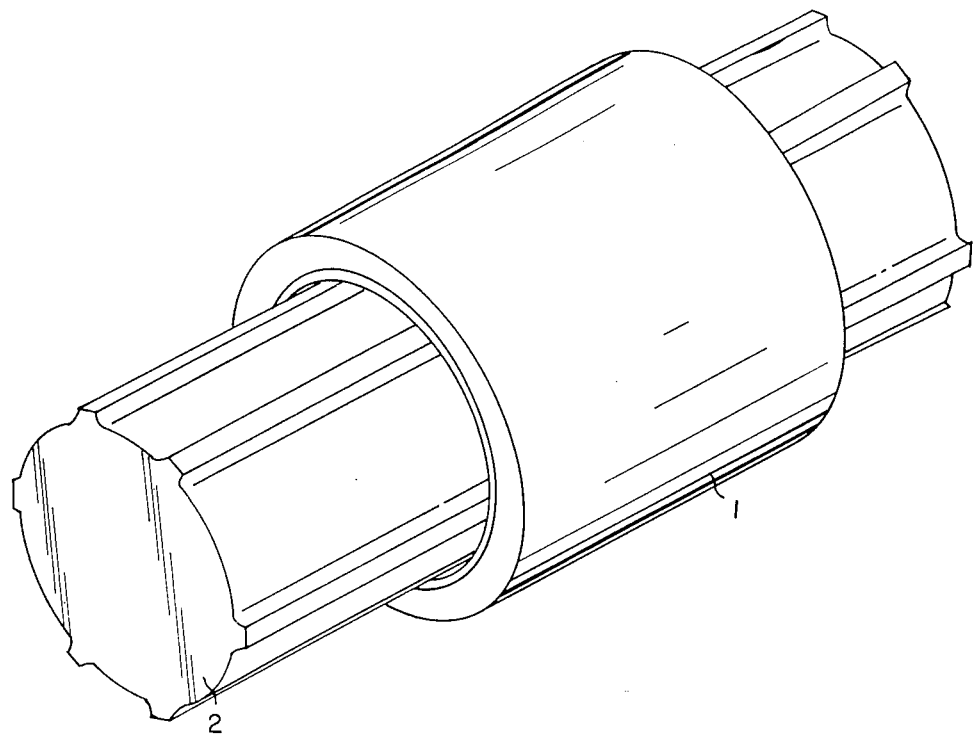
Figure 4:
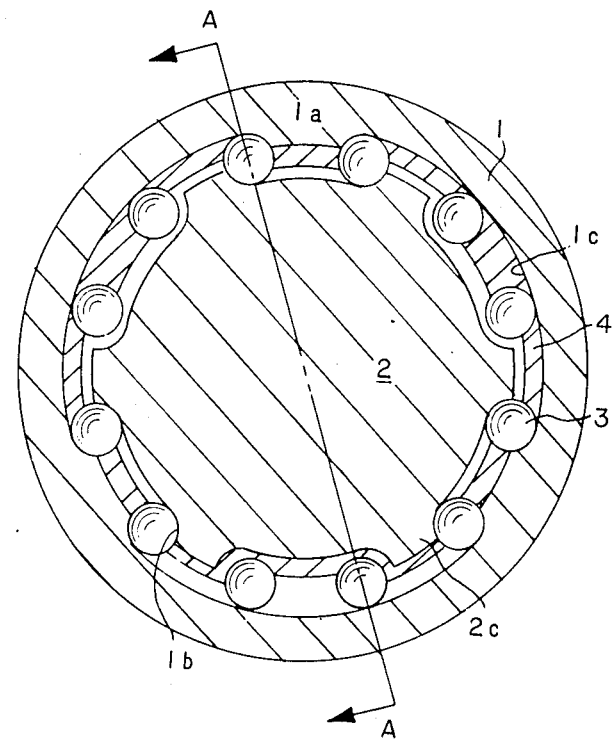
Figure 5:
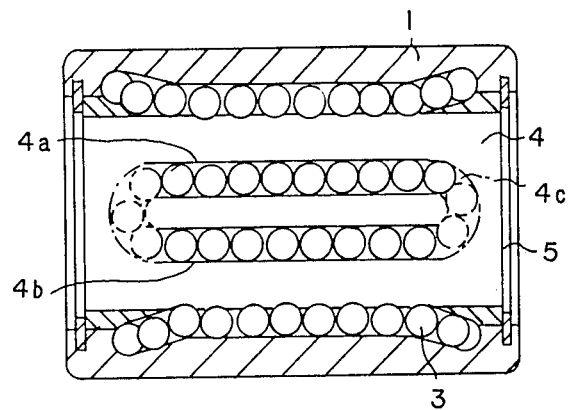
Figure 6:
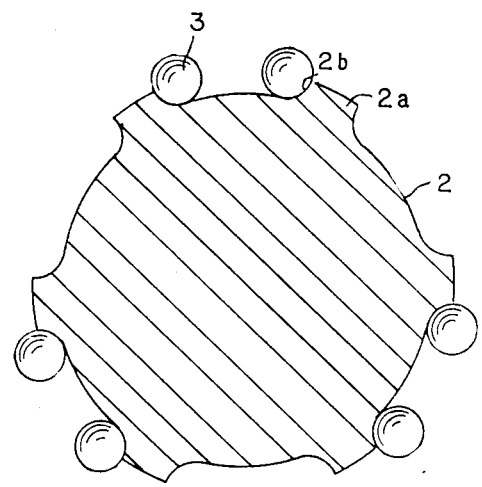
Figure 7:
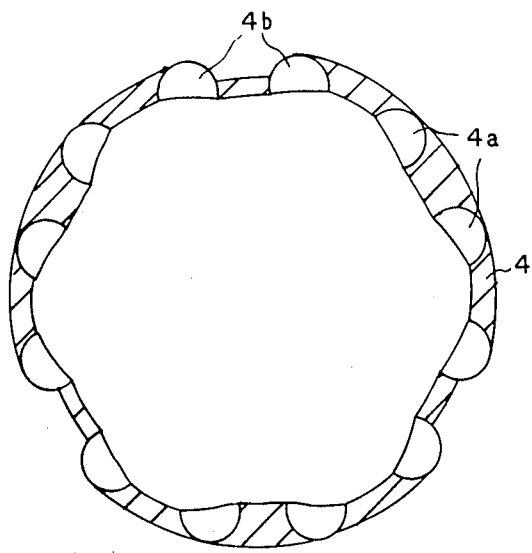

FIGS. 3 to 8B show a ball spline bearing in one embodiment of the present invention, in which FIG. 3 is a perspective view, FIG. 4 is a cross sectional view in the radial direction, FIG. 5 is a cross sectional view taken along the line A—A in FIG. 4 wherein a spline shaft is omitted, and FIGS. 6 and 7 are cross sectional views showing the spline shaft and a holding apparatus, respectively.

In the drawings, a reference numeral 1 denotes an outer cylinder; 2 is a spline shaft 3 balls; and 4 a holding apparatus. As is practically illustrated in FIG. 4, the outer cylinder 1 is formed with three projections 1a in the inner peripheral surfaces at regular intervals in the axial direction. Track grooves 1b adapted to load the balls 3 are formed on both side surfaces of the projection 1a. U-shaped grooves 1c between the respective projections 1a are formed to have substantially the same depth. The holding apparatus 4 is fixed to the inner peripheral surface of the outer cylinder 1. Windows 4a for the return passage of the balls 3 are symmetrically formed on the right and left sides with respect to the central line of the U-shaped groove 1c. In addition, track windows 4b (FIG. 7) each width of which is slightly narrower than each diameter of the balls are formed in the axial direction at the locations of the track grooves. A numeral 4c (FIG. 5) denotes a direction turning passage. The spline shaft 2 is formed with six protuberances 2a (FIGS. 4 and 6). Track grooves 2b are formed in the portions which are in contact with the balls 3.

A schematic structure of the infinite circulating passage for the balls is shown in the central portion in FIG. 5 and it is not concerned with FIG. 3. In FIG. 5, a numeral 5 represents a snap ring.

Figure 8A:
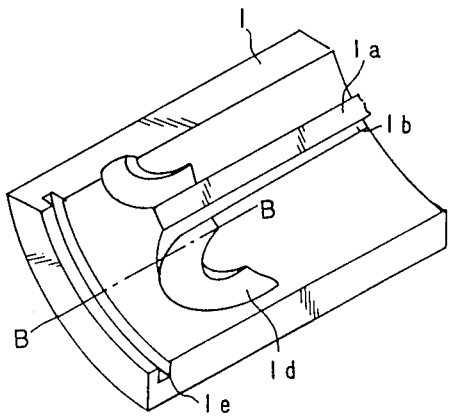
FIG. 8A is a perspective view showing a portion of the inner peripheral surface of an outer cylinder.
Figure 8B:
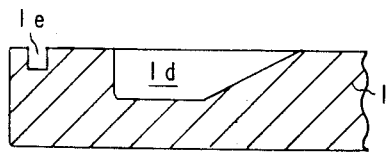

FIG. 8A is a partial perspective view of a portion of the outer cylinder 1 with a part cut away. FIG. 8B is a cross sectional view taken along the line B—B in FIG. 8A. Direction turning passages 1d (concave portions) are formed on both right and left sides of the projection 1a in the inner peripheral surface of the outer cylinder 1. A number 1e is a groove in which the snap ring 5 is inserted.

Figure 9A:
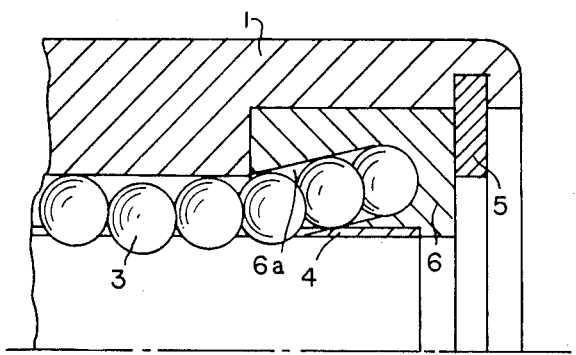
FIG. 9A is a partial cross sectional view showing a modified form of the invention.
Figure 9B:
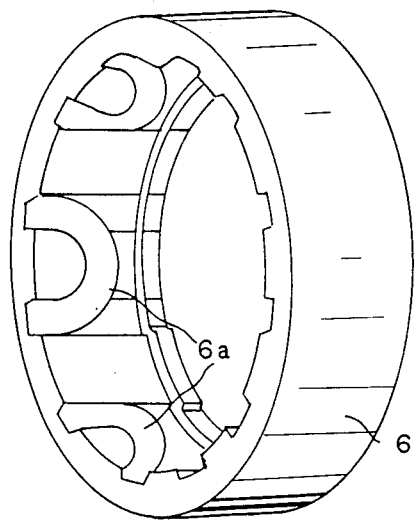
FIG. 9B is a perspective view showing the main part of the modified form of FIG. 9A.

FIG. 9A is a partial cross sectional view showing a modified form of the ball spline bearing shown in FIGS. 8A and 8B. FIG. 9B is a perspective view showing the main part of FIG. 9A. In the bearing of FIGS. 8A and 8B, the U-shaped grooves are formed and the direction turning passages 1d are formed on the side of the outer cylinder 1. However, in the case where the inner diameter of the outer cylinder is small, a tool cannot be put in the outer cylinder, so that it is difficult to work.

Therefore, in the example of FIGS. 9A and 9B, the outer cylinder 1 is formed with a circular groove 8 in which the portions corresponding to the direction turning passages are largely cut away. A side plate 6 having direction turning passages 6a is come into engagement with the circular groove 8.

With this arrangement, the outer cylinder 1 has a simple cross sectional shape and can be easily worked. In addition, since the occurrence of distortion due to the heat treatment becomes little, its working accuracy is improved and this bearing can be cheaply manufactured. The side plate 6 may be easily formed of a plastic or the like by way of an injection molding.

Figure 10:
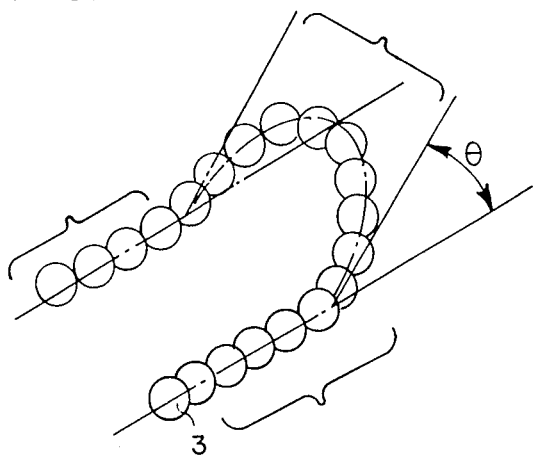
FIG. 10 is a perspective view diagrammatically showing the locus of the infinite circulating passage for the balls.

FIG. 10 is a perspective view diagrammatically showing the locus of the infinite circulating passage for the balls which is formed in the inner peripheral surface of the outer cylinder. The balls locating in the track grooves are moved to the return passage by crossing the protuberance of the spline shaft; therefore, the balls are moved along an arc-like passage while being gradually raised in the radial direction at both ends of the direction turning passage.

In the foregoing embodiments, the positioning of the holding apparatus in the outer cylinder is performed by means of the projections 1a of the outer cylinder with respect to the radial direction and is performed by way of the snap ring 5 with regard to the axial direction. However, the invention is not limited to this method but may use another general fixing technology.

According to the present invention, the following effects are obtained.

(1) The shape of the outer cylinder is simplified and the distortion due to the heat treatment and the working error in the grinding work or the like are little, and the cheap outer cylinder with a high accuracy can be formed.

(2) The rigidity of the spline shaft increases since the number of protuberances is increased.

(3) The height of the cross section of the whole bearing can be set to be low.

(4) It is possible to provide a ball spline bearing with a long life and a little slide resistance from the above effects.

The present invention is not limited to the foregoing embodiments but many modifications and variations are possible within the spirit and scope of the appended claims of the invention.

What is claimed is:

1. A ball spline bearing comprising:
   a number of substantially identical balls;
   an outer cylinder shaped as a hollow cylinder in which axially extending projections are formed in the inner peripheral surface of said outer cylinder at regular intervals the circumferential width of each of said projections being relatively narrow, while an axial length of each of said projections is shorter than the axial length of said outer cylinder, track grooves adapted to load said balls being formed in both side surfaces of each of said projections, U-shaped grooves being formed between said respective projections and having a predetermined substantially constant depth, the circumferential width of each of said U-shaped grooves being much greater than the circumferential width of each of said projections, and circularly curved direction turning passages formed at both axial ends of said projections so as to move the balls from each of said track grooves to a corresponding return passage formed in each of said U-shaped grooves;
   cylindrical holding means fixed to the inner peripheral surface of said outer cylinder, in which, two of said return passages extending parallel to said track grooves are formed between said projections of said outer cylinder, each of said return passages connecting to the end of the corresponding circularly curved direction turning passage so as to form endless circulating passages for the balls, and windows extending in the axial direction, each width of said windows being slightly narrower than the diameter of each ball, being formed at least at the locations corresponding to said track grooves; and
   a spline shaft having protuberances therein in axial direction so as to sandwich two rows of the load balls toward each other, in which the circumferential width of each of said protuberances is relatively narrow, and a track groove is formed in one side surface of each of said protuberances so that two of said track grooves formed respectively in adjacent protuberances face each other.

2. A ball spline bearing according to claim 1, wherein said projections are formed at regular intervals at three locations in the inner peripheral surface of said outer cylinder, and said protuberances are formed at regular intervals at six locations on said spline shaft.

* * * * *